(12) United States Patent
Campbell et al.

(10) Patent No.: US 7,310,577 B2
(45) Date of Patent: Dec. 18, 2007

(54) INTEGRATED CAPACITIVE BRIDGE AND INTEGRATED FLEXURE FUNCTIONS INERTIAL MEASUREMENT UNIT

(75) Inventors: Ray F. Campbell, Newport Beach, CA (US); Joan D. Wada, Anaheim, CA (US); John P. Raab, Placentia, CA (US)

(73) Assignee: The Boeing Company, Chicago, IL (US)

( * ) Notice: Subject to any disclaimer, the term of this patent is extended or adjusted under 35 U.S.C. 154(b) by 617 days.

(21) Appl. No.: 10/953,726

(22) Filed: Sep. 29, 2004

(65) Prior Publication Data

US 2006/0069469 A1 Mar. 30, 2006

(51) Int. Cl.
G06F 19/00 (2006.01)
G01C 21/16 (2006.01)

(52) U.S. Cl. .......................... 701/220; 701/4; 701/116; 701/221; 702/150; 702/153; 73/1.78

(58) Field of Classification Search .................. 701/4, 701/220, 116, 221; 702/150, 153; 73/1.75, 73/1.77, 1.78, 514.32; 342/358; 280/5.507
See application file for complete search history.

(56) References Cited

U.S. PATENT DOCUMENTS

| | | | |
|---|---|---|---|
| 2,696,566 A | 12/1954 | Lion | |
| 2,711,590 A | 6/1955 | Wilcox | |
| 3,186,101 A | 6/1965 | Wolpert | |
| 3,226,981 A | 1/1966 | Mullins et al. | |
| 3,290,786 A | 12/1966 | Parkin | |
| 3,417,626 A | 12/1968 | Riordan | |
| 3,746,281 A | 7/1973 | Stripling | |
| 4,470,562 A | 9/1984 | Hall et al. | |
| 4,507,737 A | 3/1985 | LaSarge et al. | |
| 4,583,296 A | 4/1986 | Dell'Acqua | |
| 4,601,206 A | 7/1986 | Watson | |
| 4,792,676 A | 12/1988 | Hojo et al. | |
| 4,912,397 A | 3/1990 | Gale et al. | |
| 4,987,779 A | 1/1991 | McBrien | |
| 5,008,774 A | 4/1991 | Bullis et al. | |
| 5,031,330 A | 7/1991 | Stuart | |
| 5,079,847 A | 1/1992 | Swartz et al. | |
| 5,124,938 A | 6/1992 | Algrain | |
| 5,146,417 A | 9/1992 | Watson | |
| 5,180,986 A | 1/1993 | Swartz et al. | |
| 5,191,713 A | 3/1993 | Alger et al. | |
| 5,283,528 A | 2/1994 | van Seeters | |

(Continued)

FOREIGN PATENT DOCUMENTS

EP 585862 A1 3/1994

(Continued)

*Primary Examiner*—Tan Q. Nguyen
(74) *Attorney, Agent, or Firm*—Ostrager Chong Flaherty & Broitman P.C.

(57) ABSTRACT

An inertia control system includes an integrated inertial measurement unit coupled to an inertial platform. The integrated inertial measurement unit includes three accelerometer gimbals/axes (first, second, and third) respectively, each including a pair of flexure plate accelerometers. First and second accelerometers are coupled to the first gimbal, third and fourth accelerometers are coupled to the second gimbal, and fifth and sixth accelerometers are coupled to the third gimbal. The system further includes a processor utilizing outputs from the inertial measurement unit in three processor modes, including a leveling mode, a compass mode, and an operational mode.

20 Claims, 5 Drawing Sheets

U.S. PATENT DOCUMENTS

| | | | |
|---|---|---|---|
| 5,301,114 A * | 4/1994 | Mitchell | 701/220 |
| 5,325,065 A | 6/1994 | Bennett et al. | |
| 5,379,223 A * | 1/1995 | Asplund | 701/4 |
| 5,383,363 A | 1/1995 | Kulmaczewski | |
| 5,415,040 A | 5/1995 | Nottmeyer | |
| 5,454,266 A | 10/1995 | Chevroulet et al. | |
| 5,456,111 A | 10/1995 | Hulsing, II | |
| 5,461,319 A | 10/1995 | Peters | |
| 5,495,414 A | 2/1996 | Spangler et al. | |
| 5,597,956 A | 1/1997 | Ito et al. | |
| 5,774,996 A | 7/1998 | Ogawa et al. | |
| 5,801,309 A | 9/1998 | Carr et al. | |
| 5,801,313 A | 9/1998 | Horibata et al. | |
| 5,831,164 A | 11/1998 | Reddi et al. | |
| 5,861,754 A | 1/1999 | Ueno et al. | |
| 5,905,203 A | 5/1999 | Flach et al. | |
| 5,969,250 A | 10/1999 | Greiff | |
| 5,986,497 A | 11/1999 | Tsugai | |
| 6,128,955 A | 10/2000 | Mimura | |
| 6,230,566 B1 | 5/2001 | Lee et al. | |
| 6,293,148 B1 | 9/2001 | Wang et al. | |
| 6,338,199 B1 | 1/2002 | Chigira et al. | |
| 6,449,857 B1 | 9/2002 | Anikolenko | |
| 6,467,346 B1 | 10/2002 | Challoner et al. | |
| 6,609,037 B1 | 8/2003 | Bless et al. | |
| 6,622,647 B2 | 9/2003 | DePoy | |
| 6,662,654 B2 | 12/2003 | Miao et al. | |
| 6,688,013 B2 | 2/2004 | Greway | |
| 6,691,549 B2 * | 2/2004 | Froeschl et al. | 73/1.75 |
| 6,701,788 B2 | 3/2004 | Babala | |
| 6,731,121 B1 | 5/2004 | Hsu et al. | |
| 6,776,043 B1 | 8/2004 | Campbell et al. | |
| 6,785,975 B1 | 9/2004 | Campbell et al. | |
| 6,810,739 B1 | 11/2004 | Campbell et al. | |
| 2002/0005297 A1 | 1/2002 | Alft et al. | |
| 2002/0190607 A1 | 12/2002 | Padden et al. | |
| 2003/0079543 A1 | 5/2003 | Potter | |

FOREIGN PATENT DOCUMENTS

| | | |
|---|---|---|
| JP | 06082469 A | 3/1994 |

* cited by examiner y-plane is shown vertically out of paper x-plane is shown vertically into paper z-plane is shown vertically into paper

| Accelerometer Ref. | Linear Acceleration Measurement Direction | Angular Acceleration Measurement Axis |
|---|---|---|
| 1, 2 | y | x |
| 3, 4 | z | y |
| 5, 6 | x | z |

INTEGRATED CAPACITIVE BRIDGE AND INTEGRATED FLEXURE FUNCTIONS INERTIAL MEASUREMENT UNIT

TECHNICAL FIELD

The present invention relates generally to accelerometers, and more particularly, to integrated capacitive bridge and integrated flexure functions inertial measurement units.

BACKGROUND ART

Current systems, such as missiles, spacecraft, airplanes and automobiles, include inertial regulating systems or inertial measurement units for orienting the systems relative to the earth. Many inertial measurement units include accelerometers, such as capacitive accelerometers, for determining system inertia. It is well known that capacitive accelerometers measure the acceleration, vibration and the inclination of objects to which they are attached. In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

As was mentioned, this type of accelerometer can be used in aerospace inertial measurement units or in a portion of an aircraft or spacecraft navigation or guidance system. Accordingly, the temperature in the operating environment of the accelerometer changes over a wide range. Consequently, acceleration must be measured with a high accuracy over a wide range of temperatures and temperature gradients. This is often a difficult and inefficient process.

Additionally, missile systems require a high degree of accuracy regarding angular and linear acceleration measurements. Improvements in this regard are constantly being sought out.

The disadvantages associated with current accelerometer systems have made it apparent that a new accelerometer system is needed. The new accelerometer system should substantially minimize temperature sensing requirements and should also improve acceleration detection accuracy. The present invention is directed to these ends.

SUMMARY OF THE INVENTION

In accordance with one aspect of the present invention, an inertia control system includes an integrated inertial measurement unit coupled to an inertial platform. The integrated inertial measurement unit includes three accelerometer gimbals/axes (first, second, and third) respectively each including a pair of flexure plate accelerometers. In other words, first and second accelerometers are coupled to the first gimbal, third and fourth accelerometers are coupled to the second gimbal, and fifth and sixth accelerometers are coupled to the third gimbal. The system further includes a processor utilizing outputs from the inertial measurement unit in three distinct modes. Each mode could be implemented using individual assemblies but for efficiency and reliability, the functions will be performed as shared tasks.

The first mode is the leveling mode of the platform, whereby the platform is positioned perpendicular to the local gravity vector. This is accomplished by holding the gimbal angles of the fifth and sixth accelerometers and the third and fourth accelerometers constant and rotating the first and second accelerometer gimbals through 360°. While rotating each accelerometer pair, the processor records the gimbal angle where the maximum force was detected, and this data is used by the processor to compute the spatial gravity vector with respect to the platform. The processor computes and commands the gimbal angles, which will result in the xz-plane being perpendicular to the measured gravity vector. The processor verifies the vertical orientation of the integrated inertial measurement unit by rotating the platform 90° so that the z-axis is vertical and the third and fourth accelerometers are equal and also equal to the value previously measured by the first and second accelerometers. The processor and platform then restore the xz-plane to the correct position and proceed with the compass mode.

The next mode is the compass mode, which establishes the east-west vector of the rotation of the earth. This is accomplished when the processor rotates the leveled platform about the z-axis and records the gimbal angle where the force vector is maximum and positive as indicated by a gyrocompass. This establishes the east-west direction of the earth and is used as the compass reference base.

The leveling mode and the compass mode establish the leveling and pointing vectors and the respective gimbal angles are recorded by the processor for the maintenance of inertial position and guidance utility.

Following the leveling and compass modes, the system activates the operational inertial mode, wherein the processor uses the angular outputs to maintain the inertial position and both the linear and angular outputs to compute velocity, distance and any other data, as required.

One advantage of the present invention is that it generates a dynamic range and granularity sufficient for Inter-Continental Ballistic Missile (ICBM) usage. Moreover, the accelerometer consumes less power than current accelerometers, while dramatically improving reliability.

The integrated inertial measurement unit system generates reliable angular and linear acceleration measurements. These measurements are accurate to the degree required by missile systems and will therefore provide a dramatic improvement in reliability and manufacturing costs.

Another advantage is that it is not substantially affected by changes in temperature or temperature gradients. The flexure configuration reduces the temperature sensitivity, thereby enhancing the signal-to-noise ratio.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to an aerospace system 10, particularly suited to the aerospace field. The present invention is, however, applicable to various other uses that may require accelerometers, such as any system requiring position and velocity measurements under extreme conditions, as will be understood by one skilled in the art.

Figure 1:
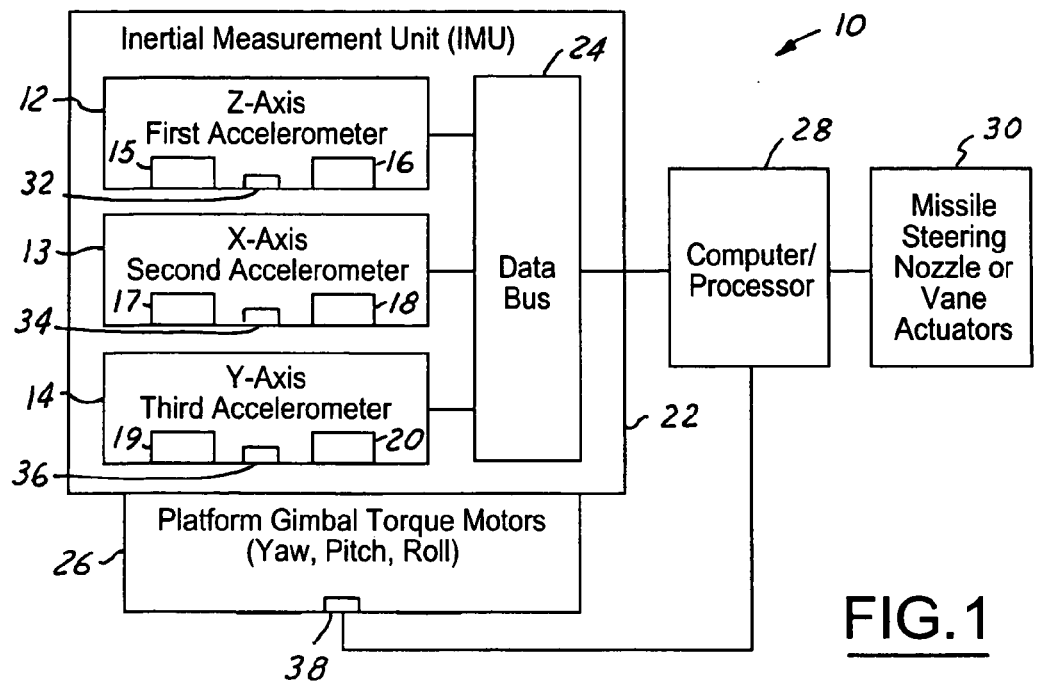
FIG. 1 illustrates an aerospace system including an integrated inertial measurement unit in accordance with one embodiment of the present invention.

Referring to FIG. 1, the leveling system 10, which is an aerospace, accelerometer system for controlling inertia, including an integrated inertial measurement unit 22 having three accelerometer gimbals/axes 12, 13, 14 (first, second, and third) respectively each including a pair of accelerometers 15, 16 and 17, 18 and 19, 20, is illustrated. The aerospace system 10 is merely an illustrative example of an accelerating object and not meant to be limiting. For example, the present integrated inertial measurement unit 22 could be implemented in any accelerating object to sense acceleration forces, including any type of vehicle or missile system, such as a Minuteman III missile system or a tactical missile system.

The illustrated aerospace system 10 includes the previously mentioned inertial measurement unit 22 and a data bus 24 and further includes gimbal and torque motors 26, a computer/processor 28 (processor), and missile steering nozzle or vane actuators 30.

The inertial measurement unit accelerometer gimbals 12, 13, 14 defining the x-, y-, and z-axes are coupled to the platform (including gimbal and torque motors 26 (yaw, pitch and roll motors)). The accelerometer gimbals 12, 13, 14 are also coupled to the data bus 24, which transfers information to the computer/processor 28. The processor 28 is coupled to the missile steering nozzle (or vane actuators) unit 30 and the gimbal torque motors 26.

The general configurations of the gimbal axes 12, 13, 14 are illustrated in the simplified implementation diagram of FIGS. 2-5. The gimbal axes 12, 13, 14 include six accelerometer devices 15, 16 and 17, 18 and 19, 20 in the present embodiment of the integrated accelerometer system 10. The axes 12, 13, 14 are embodied herein as a plurality of gimbals such that each accelerometer is coupled to an individual gimbal or each pair of accelerometers is coupled to an individual gimbal. Important to note is that the accelerometers are distributed among the three axes 12, 13, 14 (gimbals) in a suitable arrangement such that the processor control logic of FIGS. 11A and 11B may properly function. The present invention includes the device, the signal derivations, and the general control mechanism for detecting acceleration in inertial space.

In accordance with one embodiment of the present invention, the first and second accelerometers 15, 16 are located along the z-axis on the gimbal 12 at a distance±r from the origin and have a deflection axis perpendicular to the xz-plane. The orientation of the accelerometers 15, 16 is such that acceleration in the y direction yields a positive output, and clockwise rotation about the x-axis yields a positive angular acceleration.

The third and fourth accelerometers 17, 18 are located along the x-axis on the gimbal 13 at a distance±r from the origin and have a deflection axis perpendicular to the xy-plane. The orientation of the accelerometers 17, 18 is such that acceleration in the z direction yields a positive output, and clockwise rotation about the y-axis yields a positive angular acceleration.

The fifth and sixth accelerometers 19, 20 are located along the y-axis on the gimbal 14 at a distance±r from the origin and have a deflection axis perpendicular to the yz-plane. The orientation of the accelerometers 19, 20 is such that acceleration in the x direction yields a positive output, and clockwise rotation about the z-axis yields a positive angular acceleration.

In the present embodiment, all accelerometers and distances are equal. Alternate embodiments of the present invention include both members of the axial sets of accelerometers on either side of the origin. The accelerometers should, however, be separated by a known distance and positioned a known distance from the origin.

All accelerometers are assumed to be on an inertial platform 26 utilizing generated signals to maintain an essentially zero rotation about all three axes when in the inertial mode, which will be discussed regarding FIGS. 11A and 11B. This control will be provided by the processor 28, which can compute signals and drive the motors on the platform 26 and select the required mode and provide the output data required by the system 10. The platform 26 may be a gimbal or alternate inertial platform design known in the art. The system 10 utilizes the generated signals from the accelerometers to control the platform position to maintain a near zero rotation. The platform 26 may also include gimbal torque motors controlling the yaw, pitch, and roll gimbals, z-, x-, and y-axis gimbals 12, 13, 14.

Each axis gimbal 12, 13, 14 has an angular readout device, z-axis device 32, x-axis device 34, and y-axis device 36, to detect the current angular position with respect to the platform 26. The angular readout device may be an electrical resolver, an optical encoder, a mechanical interface or any of a wide range of devices capable of determining the angle to the accuracy required by the system 10.

The platform 26 may also include, mounted as an integral part, a gyrocompass 38, which will generate an output indicating the magnitude of the velocity vector through the xz-plane. When the plane of the platform 26 is level and local gravity is perpendicular thereto, the gyrocompass 38 may be rotated 360° in order to establish the east-west direction of the rotation of the earth. This reference will be utilized for the initial conditions for the inertial measurement unit gimbal readouts, which will be discussed further regarding FIGS. 11A and 11B.

Figure 6:
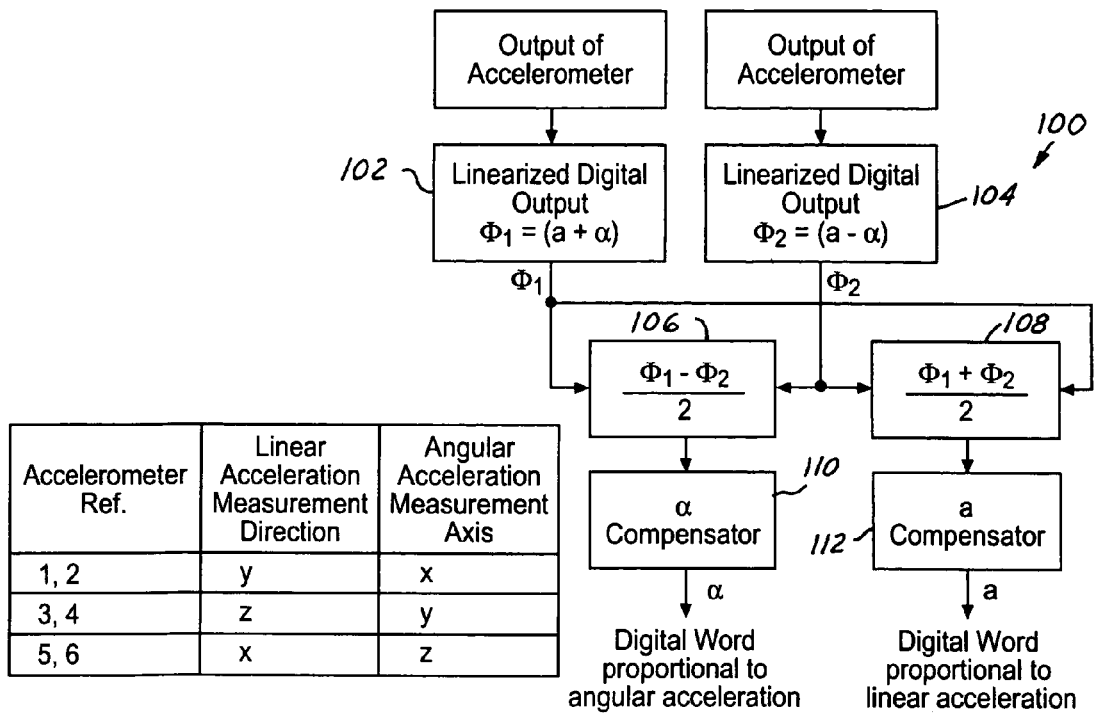
FIG. 6 illustrates a logic diagram of an integrated inertial measurement unit in accordance with another embodiment of the present invention.

Referring to FIG. 6, a block diagram 100 of signal generation logic, within the processor 28 for the linear and angular acceleration of the system 10, is illustrated.

In block 102, the distance, d of the flexured plates to the fixed plates, is proportional to the acceleration variable (as in the equation F=ma), which determines the bridge output voltage. As each accelerometer senses acceleration, either linear or angular-tangential, they deflect the sum of the forces. Because the computer/processor 28 maintains the flexure plates in the xz-plane, the total acceleration acting on each accelerometer is the sum of the linear acceleration and the tangential acceleration or linearized digital output. This is illustrated in block 102 as $(a+\alpha)$ for the first accelerometer 15 and $(a-\alpha)$, in block 104, for the second accelerometer 16. In other words, there are generated output words for the first accelerometer 15 of $\Phi_1=(a+\alpha)k$ and for the second accelerometer 16 of $\Phi_2=(a-\alpha)k$.

In block 106, for equal distances of $r_1$ and $r_2$, $\Phi_1=k_1 a+k_2 \alpha$ and $\Phi_2=k_3 a-k_4 \alpha$, and $k_1$ and $k_3$ are equal if $r_1=r_2$. Otherwise, they may be calculated or modeled for the exact expression. In this simplified case, $\Phi_1-\Phi_2=(k_2\alpha)-(-k_4\alpha)$ and therefore $\alpha=k(\Phi_1-\Phi_2)/2$, where k is a constant to be determined at manufacture, e.g., k may be defined to depend on materials and size constraints. $\alpha$ is then scaled and compensated in the compensator block 110.

In block 108, the accelerometer outputs are also added to eliminate $\alpha$ in a similar manner. The output then becomes $a=k(\Phi_1+\Phi_2)/2$ in block 108. It is then also scaled and compensated in the compensator block 112 to generate a digital word proportional to linear acceleration.

The circuitry illustrated in FIG. 6 applies the sum and difference amplitudes from blocks 106 and 108 to a compensation circuit in the compensator blocks 110 and 112, which may be lookup tables, for providing compensation for the non-linearities induced by the particular mechanical misalignment, manufacturing and other data path anomalies.

One output ($\alpha$) is a digital word proportional to the rotational (angular) acceleration in either direction about the z-axis. The other output (a) is a digital word proportional to the linear acceleration in either direction in the y-axis.

The circuitry illustrated in FIG. 6 takes these outputs and applies them to a compensation circuit, which may be a lookup table, to provide compensation for the non-linearities induced by the peculiar mechanical misalignment, manufacturing and other data path anomalies. The output is then a digital word proportional to the rotational or linear acceleration around or along their respective axis for each plane. The difference in amplitudes between each pair provides a measure of linear and angular acceleration. The angular acceleration is used to control the angular position of the integrated inertial measurement unit 22 in inertial space.

Figure 10:
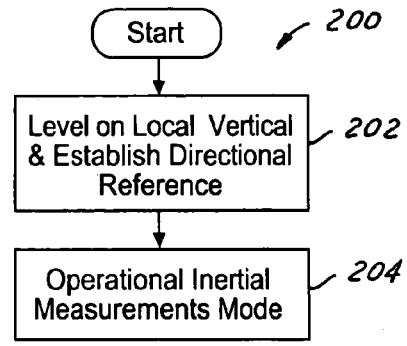
FIG. 10 illustrates a logic flow diagram of the aerospace system of FIG. 1 in operation in accordance with another embodiment of the present invention.

The integrated inertial measurement unit 22 utilizes these outputs in three distinct modes. Each mode could be implemented using individual assemblies but for efficiency and reliability, the functions will be performed as shared tasks. These modes are illustrated in FIG. 10. Important to note is that the logic of FIG. 6 is included as an example of control logic for generating linear and angular acceleration signals from accelerometer signals and various other methods known in the art may also be used in accordance with the present invention.

Referring again to FIGS. 1-5, the simplified implementation diagram of the integrated inertial measurement unit 22, in accordance with one embodiment of the present invention, is illustrated.

The integrated inertial measurement unit 22 is embodied as a six accelerometer device that generates a precise measurement of the orientation of a plane with respect to the earth. The integrated inertial measurement unit 22 includes six flexure plate accelerometers 13 (first), 14 (second), 15 (third), 16 (fourth), 17 (fifth), and 18 (sixth), each of which may be configured as illustrated in either FIG. 7 or FIG. 8. Each accelerometer is embodied as a single axis accelerometer that can provide a reliable wide dynamic range of performance.

Figure 2:
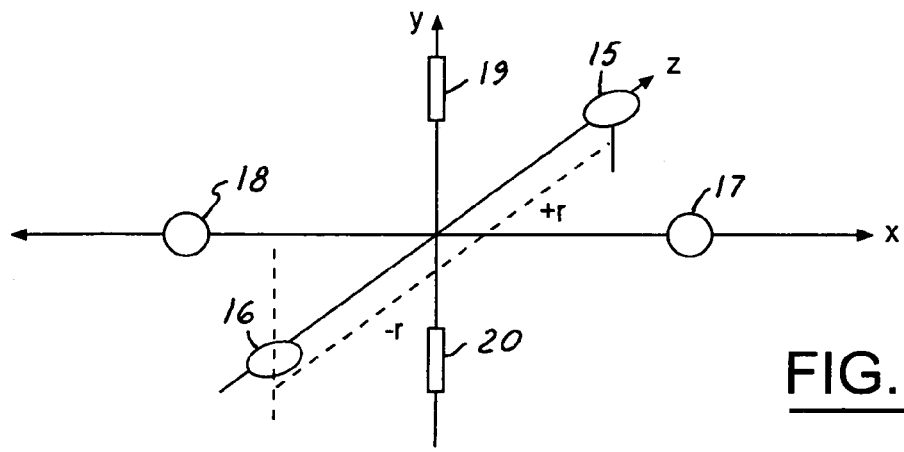
FIG. 2 illustrates a pictorial diagram of the integrated inertial measurement unit in accordance with FIG. 1.
Figure 3:
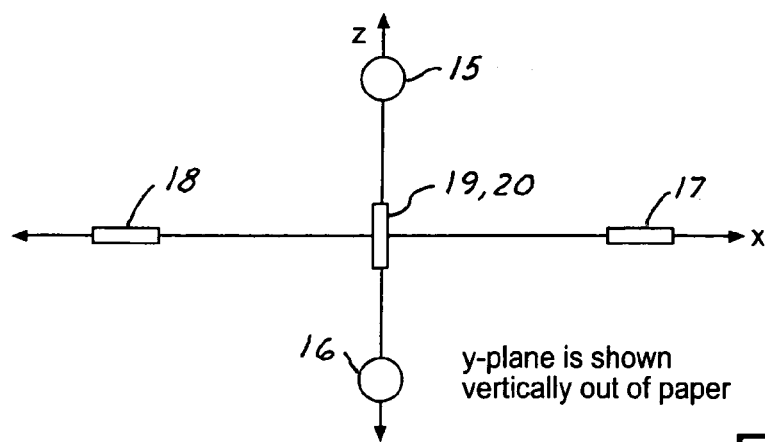
FIG. 3 illustrates a side view (xz view) of FIG. 2.
Figure 4:
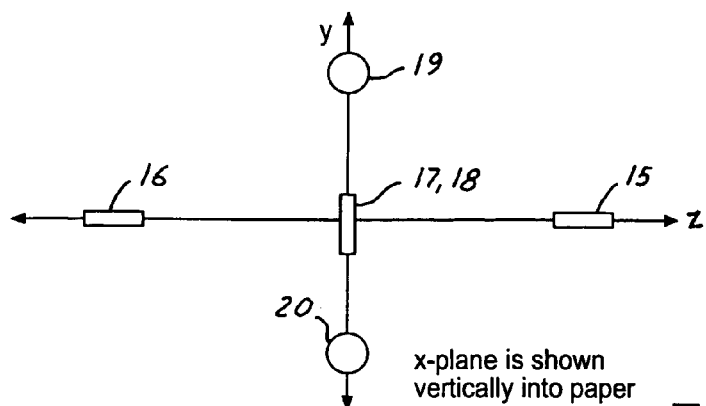
FIG. 4 illustrates a side view (z-y view) of FIG. 2.
Figure 5:
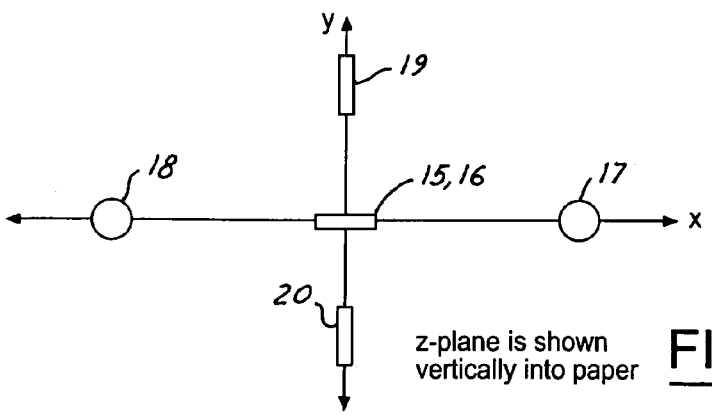
FIG. 5 illustrates a side view (x-y view) of FIG. 2.
Figure 7:
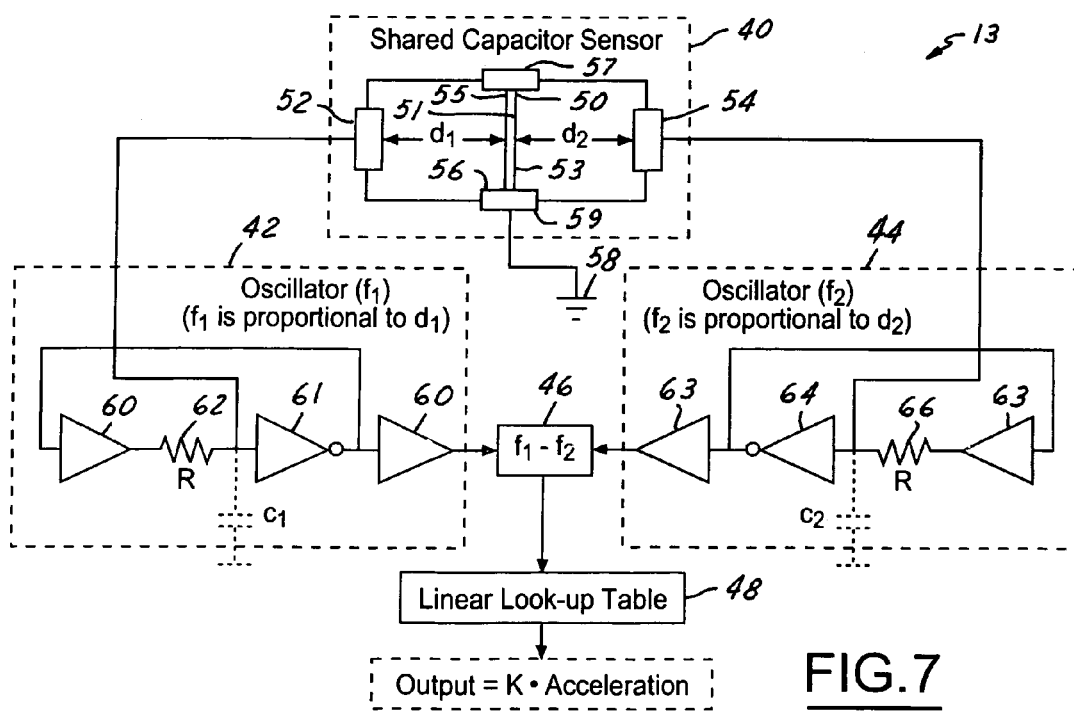
FIG. 7 illustrates an accelerometer from the integrated inertial measurement unit of FIG. 1 in accordance with another embodiment of the present invention.
Figure 8:
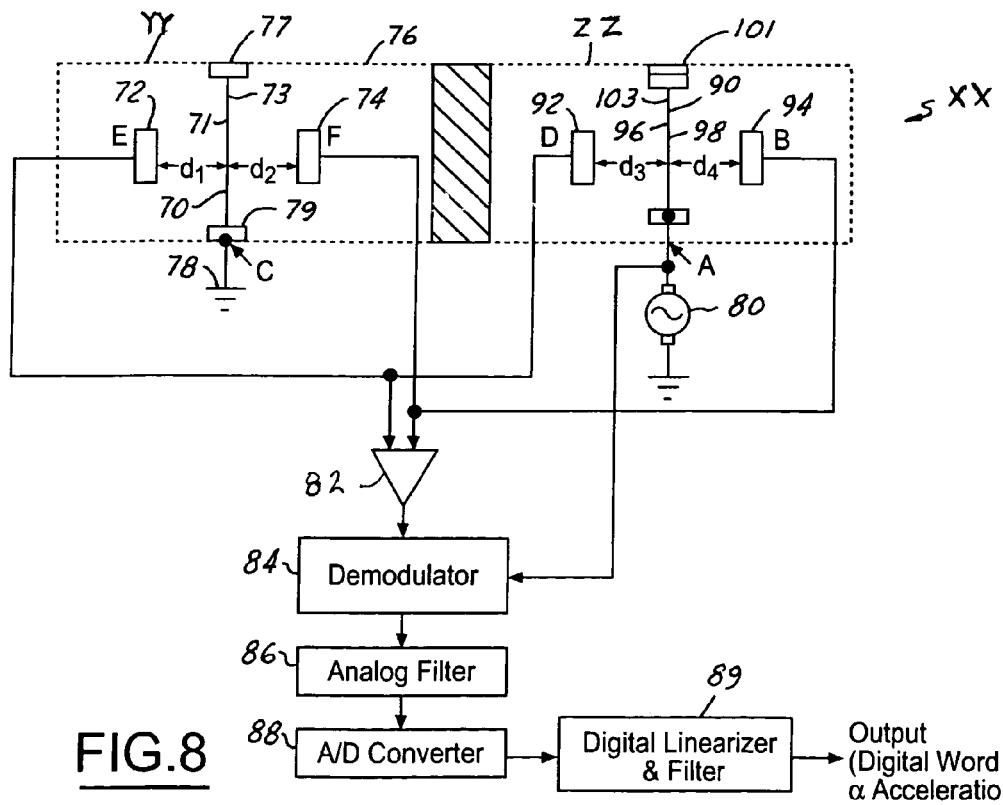
FIG. 8 illustrates an accelerometer from the integrated inertial measurement unit of FIG. 1 in accordance with another embodiment of the present invention.

Six accelerometers as in FIGS. 7 or 8, configured per FIG. 2 are included to implement the system 10. The center of each accelerometer is located at a distance r from the origin. Important to note is that the mounting angles and the distances from the origin included herein are merely illustrative examples of an efficient possible arrangement of the accelerometers. Alternate embodiments include the accelerometers at varying known distances that may or may not be identical and varying known mounting angles, which also may or may not be identical.

The first and second accelerometers 15, 16 are located along the z-axis and have an acceleration axis axial with the y-axis. The second and third accelerometers 17, 18 are located along the x-axis and have an acceleration axis axial with the z-axis. The fifth and sixth accelerometers 19, 20 are located along the y-axis and have an acceleration axis axial with the x-axis.

Referring to FIG. 7, an example of a possible configuration for the accelerometer 13 is included as an illustrative example of the six accelerometers 15, 16, 17, 18, 19, 20. The accelerometer 13 is part of an inertial measurement unit 22 (IMU), as was previously discussed. The integrated inertial measurement unit 22 includes a shared capacitor sensor 40, two oscillators 42, 44, a frequency subtraction device 46, and a Linear Lookup Table (LLT) or linearizer 48.

The shared capacitor sensor 40 includes a single flexure plate 50, two parallel fixed plates 52, 54, and a metal housing structure 56. The shared capacitor sensor 40 generates phase shift capacitance signals in response to acceleration of the aeronautical system 10, as will be discussed later.

The flexure plate 50 is positioned between the two fixed plates 52, 54 such that the first fixed 52 plate is a first distance ($d_1$) from a first side 51 and the second fixed plate 54 is a second distance ($d_2$) from a second side 53 of the flexure plate 50. The flexure plate 50 is affixed to the metal housing structure 56 through at least a portion of at least one edge 57 of the flexure plate 50, which is coupled to both ends of the flexure plate 50 and is also coupled to a ground 58. The present invention, however, includes the flexure plate 50 coupled at two edges 57, 59 for a square embodiment of the plate 50.

In the present embodiment, the flexure plate 50 is circular and coupled to the housing 56 at only one edge 57. However, numerous other shapes are included, as will be understood by one skilled in the art. The flexure plate includes a first side 51, a second side 53 and a common edge 55. The flexure plate is rigidly fixed to the metal housing structure through almost any manner known in the art. Resultantly, all the system flexure is generated within the flexure plate 50. This generally increases reliability and robustness of the system 10. This, however, generates a non-linear output from the flexure plate 50, which will be discussed regarding the linear lookup table linearizer 48.

A gas or vacuum environment is enclosed within the sensor 40 through the metal housing structure 56 such that there is no interference with the movement of the flexure plate 50 other than the acceleration of the system 10 along a perpendicular axis. During acceleration, the flexure plate 50 flexes according to the reaction force of Newton's second law of motion, force=mass×acceleration (F=ma), causing the distance between the flexure plate 50 and the fixed plates 52, 54 to vary, thus creating the two variable capacitors, one on each side of the flexure plate 50.

The combination of the first fixed plate 52 and the flexure plate 50 forms a first parallel plate capacitor, and the combination of the second fixed plate 54 and the flexure plate 50 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $C \cong (\epsilon_0 A)/d$, where $\epsilon_0$ is the permittivity constant, A is the area of a fixed plate 52 or 54 (if 1 is the length of one side and the cross section of the plate is square, then $A=1^2$) and d is the effective distance between the flexure plate 50 and one of the fixed plates 52, 54.

The first fixed plate 52 is coupled to the metal housing structure 56 and positioned a first distance ($d_1$) from the flexure plate 50. The first fixed plate 52 and the flexure plate 50 form a first capacitor whose operation is also governed by the equation $C \cong (\epsilon_0 A)/d$. The capacitance of the first fixed plate 52 responds to movement of the flexure plate 50 when $d_1$ either increases or decreases, thereby generating a first phase shift capacitance signal.

The second fixed plate 54 is also coupled to the metal housing structure 56 and positioned a first distance ($d_1$) from the flexure plate 50. The second fixed plate 54 and the flexure plate 50 form a second capacitor whose operation is governed by the equation $C \cong (\epsilon_0 A)/d$. The second fixed plate 54 responds to movement of the flexure plate 50 when $d_2$ either increases or decreases, thereby generating a second phase shift capacitance signal.

The distances ($d_1$ and $d_2$) between the flexure plate 50 and the fixed plates 52, 54 are a function of acceleration and are proportional or equal when the system 10 is at rest. Each fixed plate 52, 54 is connected to a respective oscillator 42, 44, which generates the phase shift capacitance necessary for predictable oscillation.

The first fixed plate 52 is coupled to the first oscillator 42, and the second fixed plate 54 is coupled to the second oscillator 44. The two oscillators 42, 44 are coupled to a frequency subtraction device 46, and the frequency subtraction device 46 is coupled to the LLT 48, which is coupled to a processor 28 (missile operations processor). The processor 28 is coupled to an actuator 30, and to various system components, as well as thrusters and attitude control devices.

The oscillators 42, 44 are ideally precision designs utilizing GaAs or similar material. The oscillators 42, 44 are also mounted on the metal housing structure 56 in the present embodiment.

The embodied first oscillator 42 includes components well known in the art. Although the embodied oscillator is a common oscillator type, one skilled in the art will realize that numerous other types of oscillators will also be adaptable for the present invention. The various components include, but are not limited to, two buffers, 60, an inverter 61, and at least one resistor 62. The first oscillator 42 receives the phase shift capacitance signal from the first fixed plate 52 and generates therefrom a frequency signal ($f_1$), which is inversely proportional to $d_1$.

The second oscillator 44 receives the phase shift capacitance signal from the second fixed plate capacitor and generates therefrom a second frequency signal ($f_2$), which is inversely proportional to $d_2$. The embodied oscillator 44 is similar to the first oscillator 42 and also includes a set of buffers 63, an inverter 64, and at least one resistor 66.

The frequencies ($f_1$ and $f_2$) are functions of the distances ($d_1$ and $d_2$) respectively. As the flexure plate 50 flexes, one capacitor increases and the other decreases, thereby causing one oscillator 42 to increase output frequency and the other oscillator 44 to decrease output frequency.

The frequency subtraction device 46 receives the oscillator signals ($f_1$ and $f_2$) and generates the difference thereof, i.e., $f_1-f_2$. Important to note is that the polarities of both $f_1$ and $f_2$ are determined before this difference is calculated. A resultant frequency signal is generated from the frequency subtraction device 46.

A linearizer 48 or LLT receives the overall frequency signal. The linearizer 48 compensates for both the nonlinear function generated from the frequency subtraction device 46 and any manufacturing anomalies, as will be understood by one skilled in the art. The linearizer 48 value is established in manufacturing through taking large samples of performance curves, as will be understood by one skilled in the art. The linearizer 48 output is a digital word whose magnitude is proportional to the acceleration of the system 10 in either direction along an axis perpendicular to the flexure plate 50.

Numerous alternate linearizers are also included in the present embodiment whereby a substantially linear function can be generated by compensating for nonlinear functions, for example, in the digital domain, a digital linearizer is included. The output of the linearizer 48 is an acceleration signal multiplied by a constant (k).

Statistical filtering of the linearized data somewhere significantly above the maximum flexure frequency also occurs in either the linearizer 48 or the processor 28 to reduce the overall noise impact on the system 10.

The processor 28 receives the output signals and generates a processor signal and response thereto. The processor 28 is embodied as a typical missile or airplane processor, as is familiar in the art.

The processor 28 accepts the output of each accelerometer pair and applies the compensation and calibration corrections derived from manufacturing and the earth rate calibration scheme. The actuator, here embodied as missile steering nozzle or vane actuators 30 receives processor signals and activates system components (e.g., object control devices) in response thereto. System components include for example, thrusters or attitude control devices.

Figure 9:
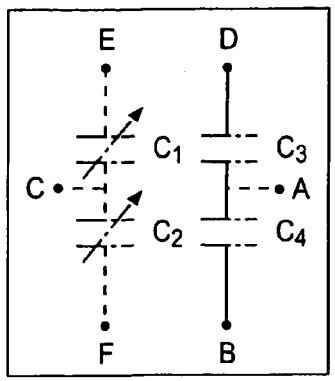
FIG. 9 illustrates the equivalent circuit for the capacitors of FIG. 8.

Referring to FIGS. 8 and 9, a bridge accelerometer in accordance with FIG. 1 is illustrated. Each bridge accelerometer XX or variable capacitance bridge accelerometer within the integrated accelerometer system 10 is a single axis accelerometer that generates a robust wide dynamic range of performance.

The accelerometer XX will be described as an illustrative example of the accelerometers in this embodiment. The accelerometer XX is part of the inertial measurement unit 22 and includes a housing 76, a flexured plate section YY, a rigid plate section ZZ, a ground 78, an AC source 80, a differential amplifier 82, a demodulator 84, an analog filter 86, an analog-to-digital converter 88, and a digital linearizer and filter 89.

The housing 76 or metal housing structure encloses four capacitors, which will be discussed later. A gas or vacuum environment is also enclosed therein such that there is no interference with the movement of the flexure plate 70 other than the acceleration of the system 10 along a perpendicular axis.

The flexured plate section YY includes a single flexure plate 70 and two parallel fixed plates 72, 74. The rigid plate section ZZ includes a rigid plate 90 and two fixed plates 92, 94. The two sections are electrically isolated and enclosed in a metal housing structure 76.

In the present embodiment, the flexure plate 70 is coupled to the housing 76 at only one edge 77. Numerous other attachment points are, however, included, as will be understood by one skilled in the art. The flexure plate includes a first side 71, a second side 73 and a common edge 77.

The flexure plate 70 is positioned between the first and second fixed plates 72, 74 such that the first fixed plate 72 is a first distance ($d_1$) from the first side 71 and the second fixed plate 74 is a second distance ($d_2$) from the second side 73 of the flexure plate 70. The flexure plate 70 is affixed to the metal housing structure 76 through at least a portion of the common edge 77 of the flexure plate 70, which is also coupled to a ground 78.

The flexure plate is rigidly fixed to the metal housing structure 76 through almost any manner known in the art. Resultantly, all the system flexure is generated within the flexure plate 70 along a flex axis (for the first accelerometer 13 this is a first flex axis, for the second accelerometer 14, this is the second flex axis). This generally increases reliability and robustness of the system 10. This, however, generates a non-linear output from the flexure plate 70, which will be discussed regarding the linearizer 89.

The combination of the first fixed plate 72 and the flexure plate 70 forms a first parallel plate capacitor, and the combination of the second fixed plate 74 and the flexure plate 70 forms the second parallel plate capacitor. The equivalent capacitor for the first parallel plate capacitor is illustrated in FIG. 9 in broken lines as $C_1$, and the equivalent capacitor for the second parallel plate capacitor is illustrated in broken lines as $C_2$.

The capacitance of the parallel plate capacitors is determined by the following: $C \cong (\epsilon_0 A)/d$, where $\epsilon_0$ is the permittivity constant, A is the area of a fixed plate 72 or 74, and d is the effective distance between the flexure plate 70 and one of the fixed plates 72, 74.

The first fixed plate 72 is coupled to the metal housing structure 76 and positioned a first distance ($d_1$) from the flexure plate 70. The first fixed plate 72 and the flexure plate 70 form a first capacitor whose operation is also governed by the equation $C \cong (\epsilon_0 A)/d$. The first fixed plate 72 responds to movement of the flexure plate 70 when $d_1$ either increases or decreases, thereby generating a first phase shift capacitance signal.

The second fixed plate 74 is also coupled to the metal housing structure 76 and positioned a second distance ($d_2$) from the flexure plate 70. The second fixed plate 74 and the flexure plate 70 form a second capacitor whose operation is governed by the equation $C \cong (\epsilon_0 A)/d$. The second fixed plate 74 responds to movement of the flexure plate 70 when $d_2$ either increases or decreases, thereby generating a second phase shift capacitance signal.

The distances ($d_1$ and $d_2$) between the flexure plate 70 and the fixed plates 72, 74 are a function of acceleration and are proportional or equal when the system 10 is at rest.

During acceleration, the flexure plate 70 flexes according to the reaction force of Newton's second law of motion, force=mass×acceleration (F=ma), causing the distance between the flexure plate 70 and the fixed plates 72, 74 to vary, thus creating the two variable capacitors $C_1, C_2$, one on each side of the flexure plate 70.

For the rigid plate section 64, which is insulated from the flexured plate section 62, the rigid plate 90 is positioned between the third fixed plate 92 and fourth fixed plate 94 such that the third fixed plate 92 is a third distance ($d_3$) from a first side 96 and the fourth fixed plate 94 is a fourth distance ($d_4$) from a second side 98 of the rigid plate 90. The rigid plate 90 is coupled to an insulator 101 through at least a portion of at least one common edge of the first side 96 and the second side 98 of the rigid plate 90, and the insulator 101 is affixed to the metal housing structure 76. The third and fourth fixed plates 92, 94 are coupled to the housing 76.

In the present embodiment, the rigid plate 90 is coupled to the housing 76 through an insulator at only one edge 103. However, numerous other attachment points are included, as will be understood by one skilled in the art.

The combination of the third fixed plate 92 and the rigid plate 90 forms a third parallel plate capacitor, and the combination of the fourth fixed plate 94 and the rigid plate 90 forms the fourth parallel plate capacitor. The equivalent capacitor for the third parallel plate capacitor is illustrated in broken lines in FIG. 9 as $C_3$, and the equivalent capacitor for the forth parallel plate capacitor is illustrated in broken lines as $C_4$.

The first and second capacitors are formed on each side of the flexure plate 70 and the third and fourth capacitors are formed on either side of the rigid plate 90. The four capacitors are electrically connected to form a bridge. The fixed capacitors (third and fourth) and rigid plate 90 are isolated from the flexured plate 70 and flexured plate capacitors (first and second). All capacitors are designed to be as nearly equal as possible when at rest.

The distance between the flexure plate 70 and the rigid plate 90 is a function of acceleration. The center of each bridge side (ED and BF in FIGS. 8 and 9) is monitored to detect the differential amplitude. As the flexure plate 70 flexes in response to acceleration, one capacitor increases and the other decreases, thereby increasing the bridge voltage on one side and decreasing bridge voltage on the other.

The bridge is excited with an AC source 80 at one end (A) and grounded at the other end (C). The ground 78 is coupled to the flexure plate 70 and the AC source 80 is coupled to the rigid plate 90. The two capacitive legs (ADEC) and (ABFC) of the bridge produce two voltage dividers, each of which provides a terminal (ED, BF), illustrated in FIG. 9, to measure the resulting voltage.

The bridge configuration reduces the temperature sensitivity and the AC excitation allowing narrow band analog filtering, both of which enhance the signal-to-noise ratio. The bridge circuitry utilizes GaAs or high speed CMOS, as the accuracy required for performance will require low propagation delays. In one embodiment, the bridge circuitry is mounted on a heated housing structure. In addition, the entire system includes a precision heating device (not illustrated) and sufficient mass to reduce gradients in the bridge in one embodiment.

The voltage phase gives direct indication of the direction of acceleration. This output is gain adjusted if required in the differential amplifier 82, and received in the demodulator 84, which rectifies the waveform as a function of the reference excitation phase from the AC source 80. The resulting waveform is then filtered in the analog domain in the analog filter 86 and received in an analog-to-digital converter 88 where the data becomes a digital word.

The digital word is then filtered and linearized in the digital linearizer and filter 89 for manufacturing and flexure non-uniformities. This output is a digital word having a magnitude proportional to the acceleration of the system in either direction along the perpendicular axis.

In other words, the linearizer 89 receives the overall digital word signal. The linearizer 89 compensates for both the nonlinear function generated from the analog-to-digital converter 88 and any manufacturing anomalies, as will be understood by one skilled in the art. The linearizer 89 value is established in manufacturing through taking large samples of performance curves, as will be understood by one skilled in the art. The linearizer 89 output is a digital word whose magnitude is proportional to the acceleration of the system 10 in either direction along an axis perpendicular to the flexure plate 70.

Numerous alternate linearizers are also included in the present embodiment whereby a substantially linear function can be generated by compensating for nonlinear functions, for example, in the digital domain, a digital linearizer is included. The output of the linearizer 89 is an acceleration signal multiplied by a constant (k).

Statistical filtering of the linearized data somewhere significantly above the maximum flexure frequency also occurs in either the digital linearizer and filter 89 or the processor 28 to reduce the overall noise impact on the system 10. The compensation for the non-linearity of the flexure structure and overall transport error is compensated for by the linearizer and filter 89 whose values are established in manufacturing through sampling performance curves.

The processor 28 receives the acceleration signal multiplied by the constant and generates a computer signal and response thereto. The processor 28 is embodied as a typical missile or airplane computer, as is familiar in the art.

The missile steering nozzle or vane actuators 30 receive the computer signal and activate the gimbal torque motors 26 or object control devices in response thereto.

Referring to FIG. 10, a logic flow diagram 200 of the system 10 in operation in accordance with another embodiment of the present invention, is illustrated. Logic starts in operation block 202, discussed in detail regarding FIGS. 11A and 11B, where the integrated inertial measurement unit becomes level with respect to a local vertical and establishes a directional reference. The first mode is the leveling mode of the platform 26 because system efficiency is optimized when the platform 26 is positioned perpendicular to the local gravity vector.

In operation block 204, an operational inertial measurements mode is engaged, as will be discussed in detail regarding FIGS. 11A and 11B.

Figure 11A:
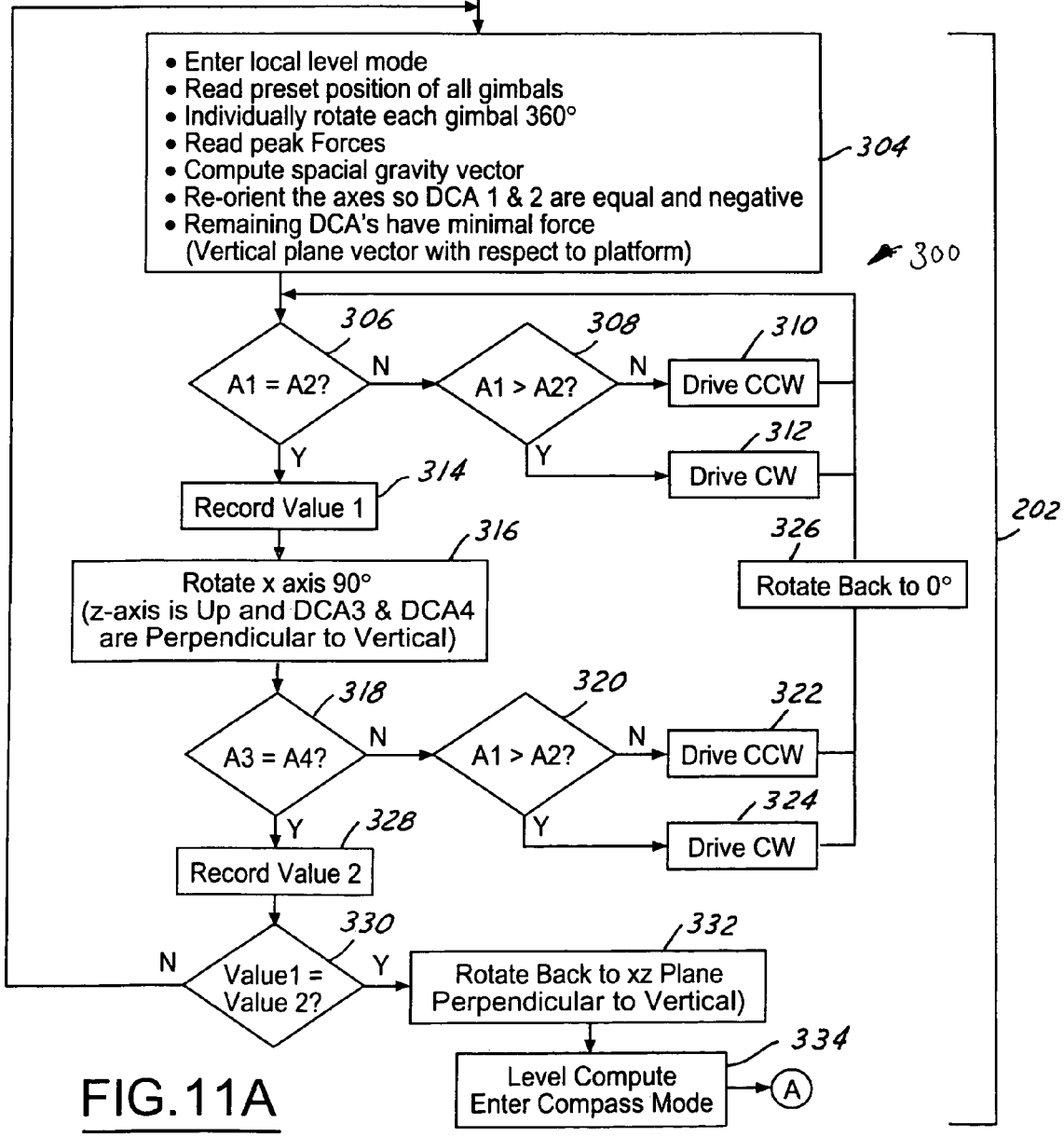
FIG. 11A illustrates a logic flow diagram of the local level mode for the system in accordance with FIG. 10.
Figure 11B:
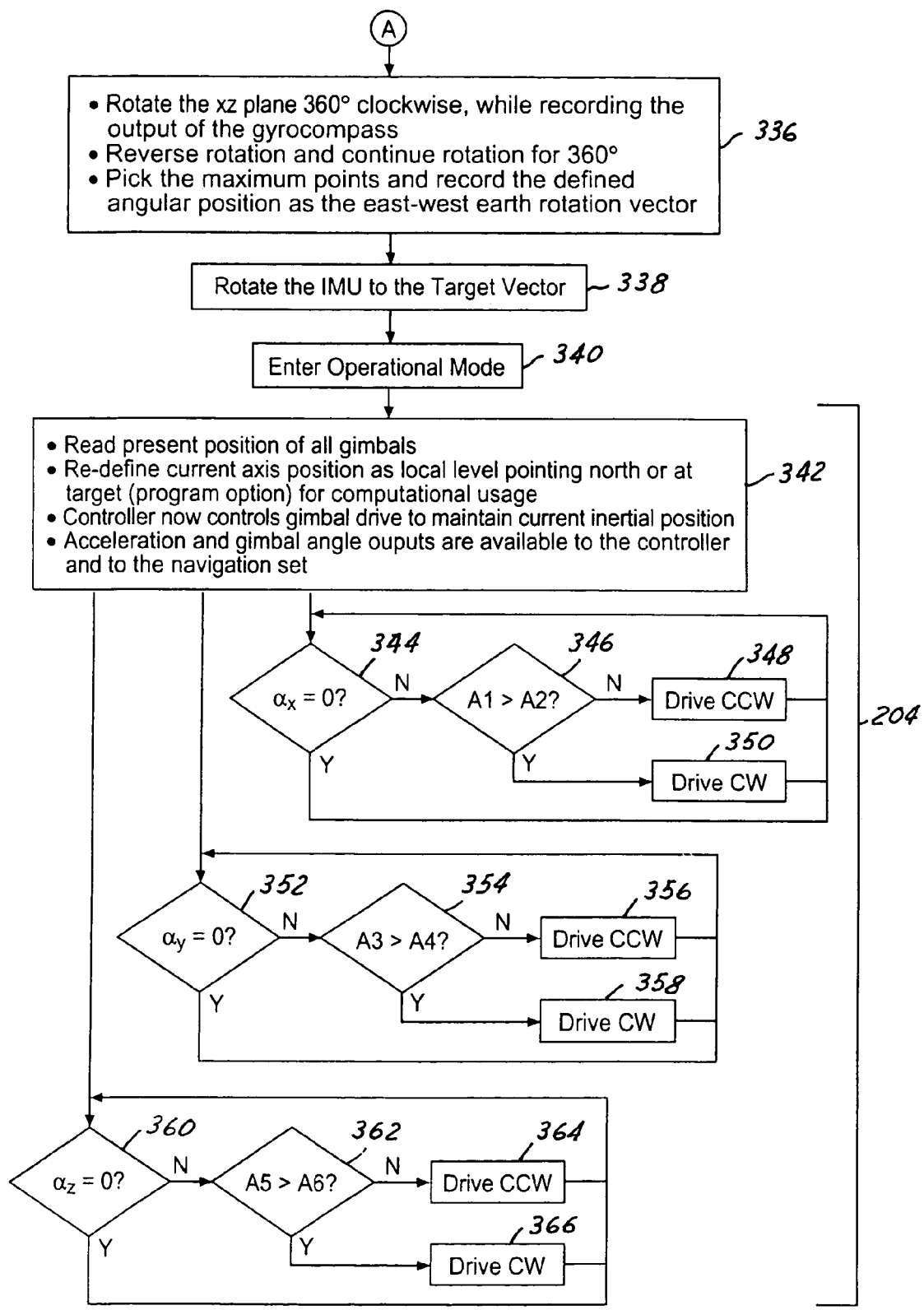
FIG. 11B illustrates a logic flow diagram of the compass mode and operational modes for the system in accordance with FIG. 10.

Referring to FIGS. 11A and 11B, a logic flow diagram 300 of the operation blocks of FIG. 10 is illustrated. Logic starts at the power up 302 of the leveling and directional operations discussed regarding FIG. 10.

It is desired that the platform be positioned perpendicular to the local gravity vector. Therefore, in operation block 304, the local level mode of the processor 28 activates, and present gimbal positions are read. The processor 28 accomplishes this by holding the gimbal angles of the fifth and sixth accelerometers 19, 20 and the third and fourth accelerometers 17, 18 constant and rotating the first and second accelerometer gimbals 15, 16 through 360°. While rotating the accelerometer pair, the processor 28 records the gimbals angles where a maximum force was detected; and this process is repeated for the other two accelerometer pairs. Maximum force data may be acquired through the logic illustrated in FIG. 6, wherein angular and linear acceleration of each accelerometer pair is generated.

The maximum force data is used by the processor 28 to compute a spatial gravity vector with respect to the platform 26. The processor 28 computes and commands the gimbal angles that will result in the xz-plane being perpendicular to the measured gravity vector. The measured force on the first and second accelerometers 15, 16 being equal and negative will evidence this. The processor 28 verifies the vertical orientation by rotating the platform 90° so that the z-axis is vertical and the third and fourth accelerometers 17, 18 will be equal and also equal to the value previously measured by the first and second accelerometers 15, 16. Thereby, the third, fourth, fifth, and sixth accelerometers 17, 18, 19, 20 have minimal force applied to them and are in the vertical plane vector with respect to the platform 26. If the vertical orientation of operation block 304 is achieved, the platform 26, through processor logic, restores the xz-plane to the correct position and proceeds with the compass mode, starting in operation block 334.

If the vertical orientation is not achieved, a re-computation is executed. Re-computation logic starts in inquiry block 306, where a check is made whether the first accelerometer signal equals the second accelerometer signal. For a negative response, in inquiry block 308, a check is made whether the first accelerometer signal is greater than the second accelerometer signal. For a negative response, in operation block 310, the first and second accelerometer axis is driven counterclockwise. Otherwise, in operation 312, the first and second accelerometer axis is driven clockwise.

For a positive response to inquiry block 306, in operation block 314, the value of the first and second accelerometers is recorded.

In operation 316, the x-axis is rotated 90° such that the z-axis is up and the third and fourth accelerometers 17, 18 are perpendicular to the vertical.

In inquiry block 318, a check is made whether the third accelerometer signal is equal to the fourth accelerometer signal. For a negative response in operation block 320, a check is made whether the first accelerometer signal is greater than the second accelerometer signal. For a negative response to inquiry block 320, in operation block 322, the third and fourth accelerometer axis is driven counterclockwise. Otherwise, the third and fourth accelerometer axis is driven clockwise in operation block 324. In response to either operation block 322 or operation block 324, the platform, in operation block 326 is rotated back to 0°.

For a positive response to inquiry block 318, and operation block 328, the value of the third and fourth accelerometer signals is recorded.

In inquiry block 330, a check is made whether the value of the first and second accelerometer signals equal the value of the third and fourth accelerometer signals. For a negative response, operation block 304 reactivates. Otherwise, in operation block 332, the platform is rotated back to the xz-plane perpendicular to the vertical.

In operation block 334, the level of the platform 26 is computed, and the system 10 enters the compass mode. The compass mode establishes the east-west vector of the rotation of the earth. This is accomplished when the processor rotates the leveled platform 26 about the z-axis and records the gimbal angle where the force vector is maximum and positive as indicated by the gyrocompass 38. This establishes the east-west direction and is then used as the compass reference base of the operational mode, starting in operation block 342.

In the compass mode, in operation block 336, the xz-plane is rotated 360° clockwise while recording the output of the gyrocompass 38 or the maximum of DBAs 17 and 18. The xz-plane is then rotated in counterclockwise for 360°, and the maximum points are selected, and the defined angular position is recorded as the east-west earth rotation factor.

In operation block 338, the inertial measurement unit is rotated to the target vector. The inertial measurement unit operation mode is then activated in operation block 340. The leveling and pointing vectors have now been established and the gimbal angles are recorded by the processor 28 for the maintenance of inertial position and guidance utility.

The unit now enters the operational inertial mode, wherein the processor 28 uses the angular outputs from, for example, logic of FIG. 6 to maintain the inertial position and both the linear and angular outputs to compute velocity, distance and any other data, as required.

In operation block 342, in the operational mode, the present position of all the gimbals are read, and the current access position is redefined as the local level pointing north or at a chosen target for computational usage. The controller or processor 28 now controls the gimbal drive for maintaining current inertial position. Acceleration and gimbal angle outputs are available to the controller 28 and to the navigation set.

A check is then made whether the platform angular acceleration at the three axes x, y, and z is equal to zero.

In inquiry block 344, a check is made whether the angular acceleration of the platform 26 is equal to zero. For a negative response, in inquiry block 346, a check is made whether the first accelerometer signal is greater than the second accelerometer signal. For a negative response, in operation block 348, the first and second accelerometer axis is driven counterclockwise. Otherwise, in operation block 350, the first and second axis is driven clockwise. Inquiry block 344 then reactivates until the angular acceleration is equal to zero for the x-axis.

In inquiry block 352, a check is made whether the angular acceleration of the y-axis is equal to zero. For a negative response, in inquiry block 354, a check is made whether the third accelerometer signal is greater than the fourth accelerometer signal. For a negative response, in operation block 356, the third and fourth accelerometer axis is driven counterclockwise. Otherwise, the third and fourth accelerometer axis, in operation block 358, is driven clockwise. Inquiry block 352 reactivates and the loop recycles until the angular acceleration of the y-axis is equal to zero.

In inquiry block 360, a check is made whether the angular acceleration of the z-axis is equal to zero. For a negative response, in inquiry block 362, a check is made whether the fifth accelerometer signal is greater than the sixth accelerometer signal. For a negative response, in operation block 364, the fifth and sixth accelerometer axis is driven counterclockwise. Otherwise, in operation block 366, the fifth and sixth accelerometer axis is driven clockwise. Inquiry block 360 reactivates and the loop recycles until the angular acceleration of the z-axis is equal to zero.

In operation, a method for operating the leveling system 10 includes a processor utilizing outputs from the inertial measurement unit in three distinct modes. Each mode could be implemented using individual assemblies but for efficiency and reliability, the functions will be performed as shared tasks.

The first mode is the leveling mode of the platform, whereby the platform is positioned perpendicular to the local gravity vector. This is accomplished by holding the gimbal angles of the fifth and sixth accelerometers and the third and fourth accelerometers constant and rotating the first and second accelerometer gimbals through 360°. While rotating each accelerometer pair, the processor records the gimbal angle where the maximum force was detected, and this data is used by the processor to compute the spatial gravity vector with respect to the platform. The processor computes and commands the gimbal angles, which will result in the xz-plane being perpendicular to the measured gravity vector. The processor verifies the vertical orientation of the integrated inertial measurement unit by rotating the platform 90° so that the z-axis is vertical and the third and fourth accelerometers are equal and also equal to the value previously measured by the first and second accelerometers. The processor and platform then restore the xz-plane to the correct position and proceed with the compass mode.

The next mode is the compass mode, which establishes the east-west vector of the rotation of the earth. This is accomplished when the processor rotates the leveled platform about the z-axis and records the gimbal angle where the force vector is maximum and positive as indicated by a gyrocompass or the maximum of DBAs 17 and 18. This establishes the east-west direction of the earth and is used as the compass reference base.

The leveling mode and the compass mode establish the leveling and pointing vectors and the respective gimbal angles are recorded by the processor for the maintenance of inertial position and guidance utility.

Following the leveling and compass modes, the system activates the operational inertial mode, wherein the processor uses the angular outputs to maintain the inertial position and both the linear and angular outputs to compute velocity, distance and any other data, as required.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A system for controlling inertia of an object comprising:
   an inertial platform;
   an inertial measurement unit coupled to said inertial platform, said inertial measurement unit comprising a z-axis gimbal, an x-axis gimbal, and a y-axis gimbal, whereby a first flexure accelerometer and a second flexure accelerometer are coupled to said z-axis gimbal, a third flexure accelerometer and a fourth flexure accelerometer are coupled to said x-axis gimbal, and a fifth flexure accelerometer and a sixth flexure accelerometer are coupled to said y-axis gimbal;
   a processor leveling said platform perpendicular to a local gravity vector, said processor computing a spatial gravity vector with respect to said platform as a function of first gimbal angles whereby said x-, y-, and z-axis gimbals experience maximum forces, said processor controlling said gimbals such that an xz-plane, formed as a function of an intersection of axes of rotation of said x- and z-axis gimbals, is perpendicular to said local gravity vector, said processor further rotating said platform about a z-axis and recording a second gimbal angle wherein a maximum positive force vector is generated, thereby establishing an east-west vector, and said processor recording said first gimbal angles and said second gimbal angle.

2. The system of claim 1, wherein said processor further comprises logic holding gimbal angles of said x-axis gimbal and said y-axis gimbal constant and rotating said z-axis gimbal through 360° and thereby generating one of said first gimbal angles.

3. The system of claim 1, wherein said processor comprises logic leveling said platform perpendicular to said local gravity vector through holding gimbal angles of said z-axis gimbal and said y-axis gimbal constant and rotating said x-axis gimbal through 360° thereby generating one of said first gimbal angles.

4. The system of claim 1, wherein said processor comprises logic leveling said platform perpendicular to a local gravity vector through holding gimbal angles of said x-axis gimbal and said z-axis gimbal constant and rotating said y-axis gimbal through 360° thereby generating one of said first gimbal angles.

5. The system of claim 1, wherein said processor comprises logic recording said second gimbal angle wherein said maximum positive force vector is generated through reading said second gimbal angle on a gyrocompass coupled to said platform.

6. The system of claim 1, wherein said processor further comprises logic maintaining an inertial position of said platform as a function of said first gimbal angles and said second gimbal angle.

7. The system of claim 1, wherein said processor further comprises logic generating velocity, distance, or platform orientation data as a function of said first gimbal angles and said second gimbal angle.

8. The system of claim 1, further comprising a z-axis angular readout device, an x-axis angular readout device, and a y-axis angular readout device, said x-, y-, and z-axis angular readout devices detecting current angular position of said x-axis gimbal, said y-axis gimbal, and said z-axis gimbal respectively relative to said platform.

9. The system of claim 8, wherein said z-axis angular readout device comprises at least one of an electrical resolver, an optical encoder, or a mechanical interface.

10. The system of claim 1 further comprising an actuator activating an object control device in response to a platform control signal from said processor.

11. The system of claim 10, wherein said object control device comprises at least one of a thruster, an attitude control device, a missile steering nozzle, or a vane actuator.

12. The system of claim 1, wherein said first flexure plate accelerometer comprises at least one of a dual capacitance accelerometer or a dual bridge accelerometer.

13. A method for controlling an inertial measurement unit having a z-axis gimbal with a first flexure accelerometer and a second flexure accelerometer positioned thereon, an x-axis gimbal with a third flexure accelerometer and a fourth flexure accelerometer positioned thereon, and y-axis gimbal with a fifth flexure accelerometer and a sixth flexure accelerometer positioned thereon, said z-, x-, and y-axis gimbals mounted on a platform, said method comprising:

leveling the platform perpendicular to a local gravity vector;

computing a spatial gravity vector with respect to the platform as a function of first angles whereby the x-, y-, and z-axis gimbals experience maximum forces;

controlling the gimbals such that an xz-plane, formed as a function of an intersection of axes of rotation of the x- and z-axis gimbals, is perpendicular to said local gravity vector;

rotating the platform about a z-axis and recording a second gimbal angle wherein a maximum positive force vector is generated, thereby establishing an east-west vector; and recording said first gimbal angles and said second gimbal angle.

14. The method of claim 13, wherein leveling the platform perpendicular to said local gravity vector further comprises holding gimbal angles of the x-axis gimbal and the y-axis gimbal constant and rotating the 2-axis gimbal through 360° thereby generating one of said first angles.

15. The method of claim 13, wherein leveling the platform perpendicular to said local gravity vector further comprises holding gimbal angles of the z-axis gimbal and the y-axis gimbal constant and rotating the x-axis gimbal through 360° thereby generating one of said first angles.

16. The method of claim 13, wherein leveling the platform perpendicular to a local gravity vector further comprises holding gimbal angles of to x-axis gimbal and the z-axis gimbal constant and rotating the y-axis gimbal through 360° thereby generating one of said first angles.

17. The method of claim 13, wherein recording said second gimbal angle wherein said maximum positive force vector is generated further comprises reading said second gimbal angle on a gyrocompass coupled to the platform.

18. The method of claim 13 further comprising maintaining an inertial position of the platform as a function of said first gimbal angles and said second gimbal angle.

19. The method of claim 13 further comprising generating velocity distance, or platform orientation data as a function of said first gimbal angles and said second gimbal angle.

20. A method for controlling an inertial measurement unit having a z-axis gimbal with a first flexure accelerometer and a second flexure accelerometer positioned thereon, an x-axis gimbal with a third flexure accelerometer and a fourth flexure accelerometer positioned thereon, and y-axis gimbal with a fifth flexure accelerometer and a sixth flexure accelerometer positioned thereon, said z-, x-, and y-axis gimbals mounted on a platform, said method comprising:

leveling the integrated inertial measurement unit with respect to a local vertical;

establishing a directional reference for the integrated inertial measurement unit;

positioning the platform perpendicular to a local gravity vector;

reading present gimbal positions for the z-axis gimbal, the x-axis gimbal, and the y-axis gimbal;

holding gimbal angles of the fifth flexure accelerometer and the sixth flexure accelerometer and the third flexure accelerometer and the fourth flexure accelerometer constant;

rotating the first flexure accelerometer and second flexure accelerometer gimbal through 360°;

while rotating the first and second flexure accelerometer gimbal, recording first and second flexure accelerometer gimbal angles where a first maximum force is detected;

rotating the third and fourth flexure accelerometer gimbal through 360°;

while rotating the third and fourth flexure accelerometer gimbal, recording third and fourth flexure accelerometer gimbal angles where a second maximum force is detected;

rotating the fifth and sixth flexure accelerometer gimbal through 360°;

while rotating the fifth and sixth flexure accelerometer gimbal, recording fifth and sixth flexure accelerometer gimbal angles where a third maximum force is detected;

computing a spatial gravity vector with respect to the platform as a function of said first, second, and third maximum force data;

computing and commanding gimbal angles that will result in an xz-plane being perpendicular to said spatial gravity vector;

checking whether a signal from the first flexure accelerometer is equal to a signal from the second flexure accelerometer;

recording a value of said first flexure accelerometer signal and said second flexure accelerometer signal;

rotating the x-axis gimbal 90° such that a z-axis is up and the third and fourth flexure accelerometers are perpendicular to said local vertical;

checking whether a signal from the third flexure accelerometer is equal to a signal from the fourth flexure accelerometer;

verifying vertical orientation by rotating the platform 90° so that said z-axis is vertical and the third and fourth flexure accelerometers are generating equal signals also equal to a value measured by the first and second flexure accelerometers;

restoring said xz-plane to a predetermined position;

recording a value of said third and fourth flexure accelerometer signals;

checking whether a value of said first and second flexure accelerometer signals equal said value of said third and fourth flexure accelerometer signals;

rotating the platform back to said xz-plane perpendicular to said vertical;

computing a level of the platform;

leveling the platform;

rotating the leveled platform about said z-axis;

recording a gimbal angle where a force vector is maximum and positive establishing an east-west direction as a function of said gimbal angle;

using said gimbal angle as a compass reference base of an operational mode;

rotating said xz-plane 360° clockwise while recording an output of a gyrocompass;

rotating said xz-plane counterclockwise for 360°;

selecting maximum points of said xz-plane as a function signals from said gyrocompass;

recording a defined angular position as an east-west earth rotation factor;

rotating the inertial measurement unit to said target vector;

activating said operation mode;

recording said gimbal angles for maintenance of inertial position and guidance utility in said operation mode;

maintain said inertial position as a function of said angular outputs;

reading a present position of all the gimbals;

redefining a current access position as a local level pointing at a predetermined target for computational usage;

controlling a gimbal drive for maintaining current inertial position of the gimbals;

checking whether platform angular acceleration at the x-, y-, and z-axes are equal to zero; and driving either the x-, y-, or z-axis gimbal in response to a signal that platform angular acceleration of the x-, y-, and z-axes gimbals are not equal to zero.

* * * * *